Dec. 8, 1959   W. G. BIHLER   2,915,924
HYDRAULIC MACHINE TOOL
Filed Dec. 27, 1957   5 Sheets-Sheet 1
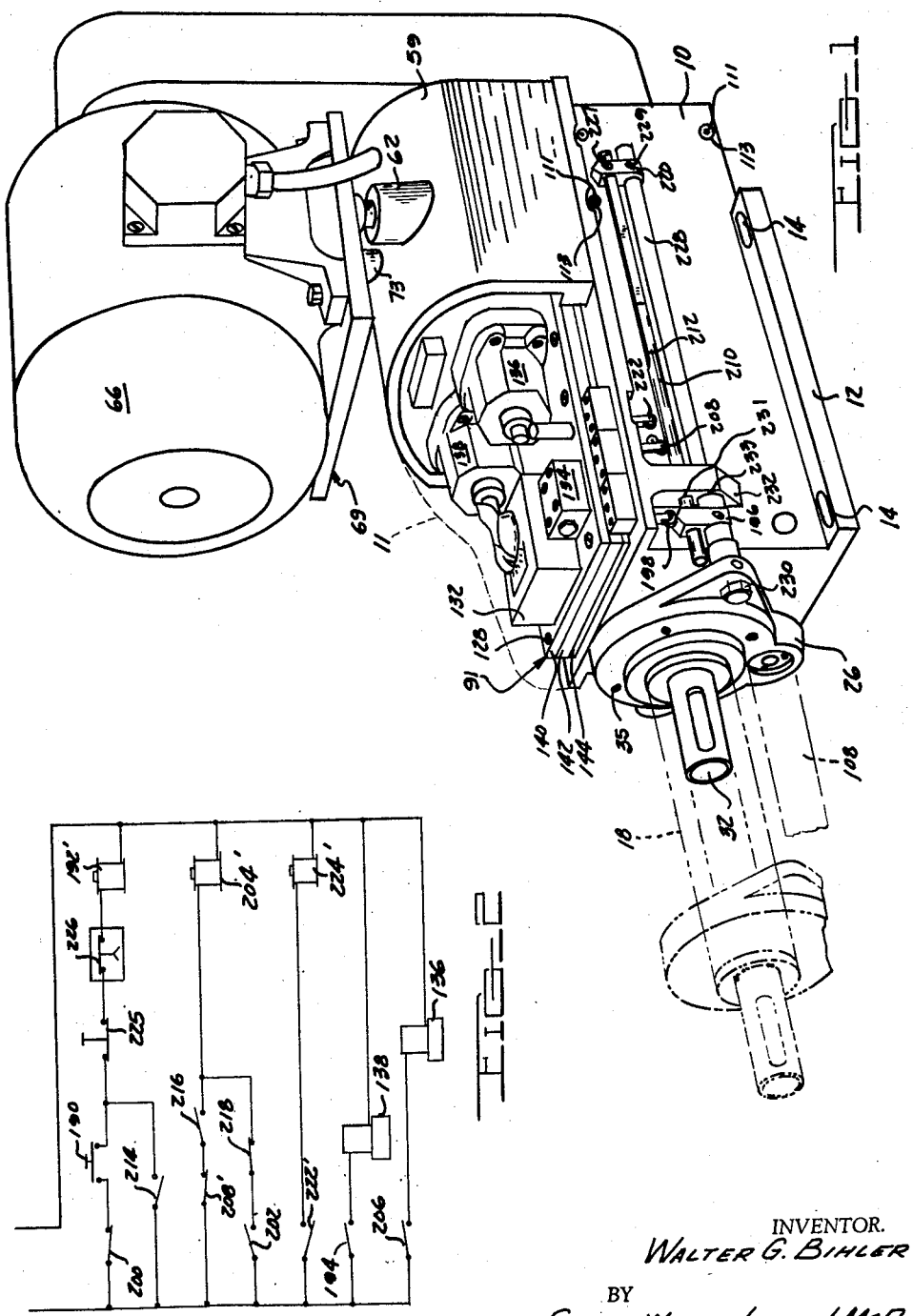
INVENTOR.
WALTER G. BIHLER
BY
SMITH, WILSON, LEWIS & McRAE

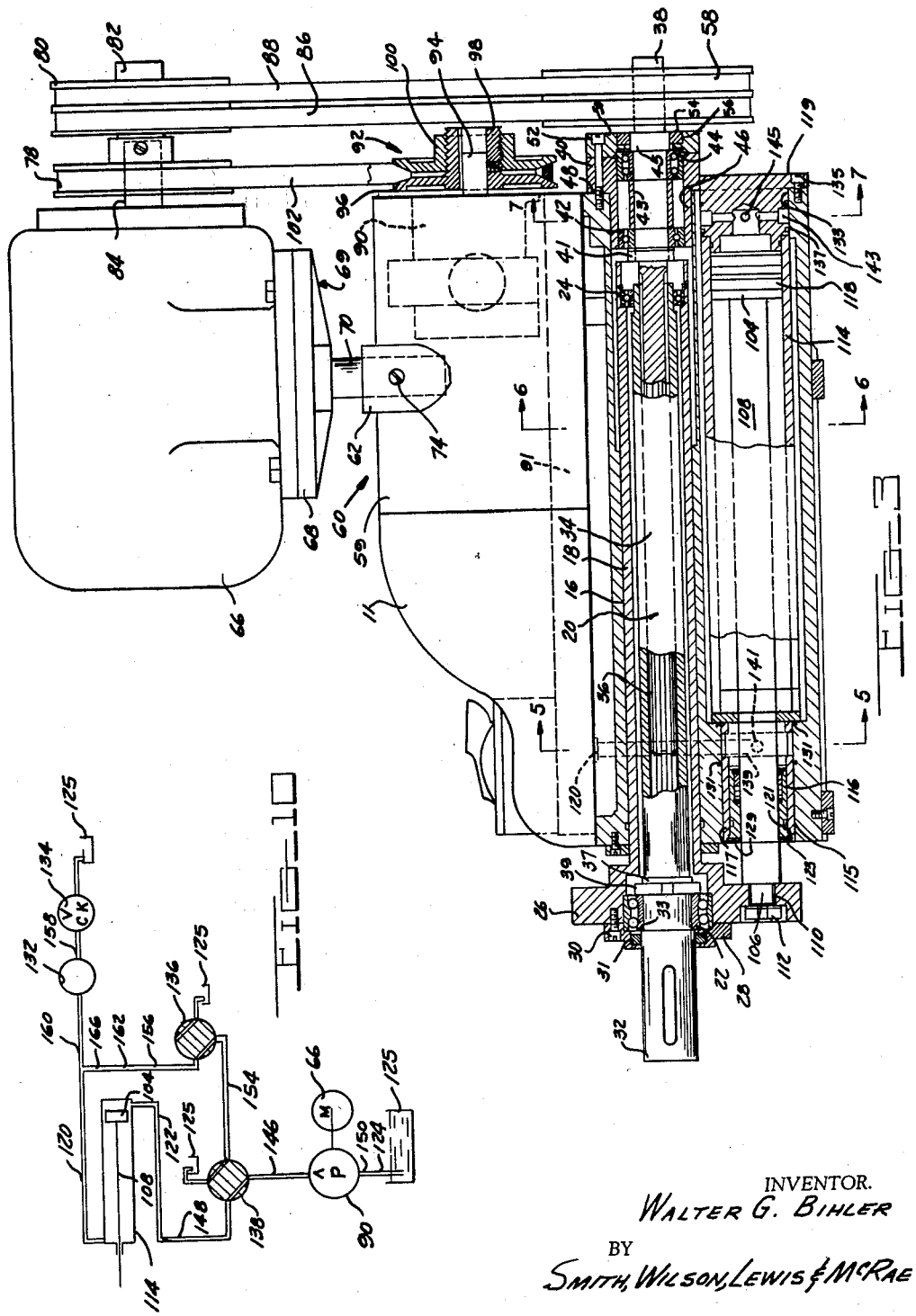

INVENTOR.
WALTER G. BIHLER
BY
SMITH, WILSON, LEWIS & McRAE

Dec. 8, 1959 W. G. BIHLER 2,915,924
HYDRAULIC MACHINE TOOL
Filed Dec. 27, 1957 5 Sheets-Sheet 4
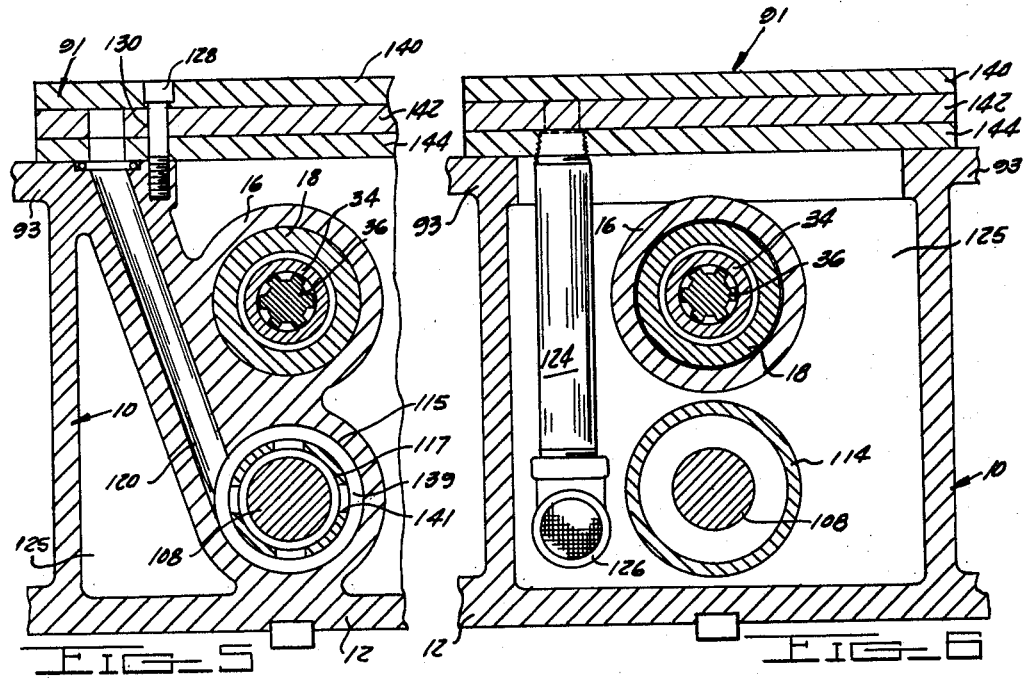
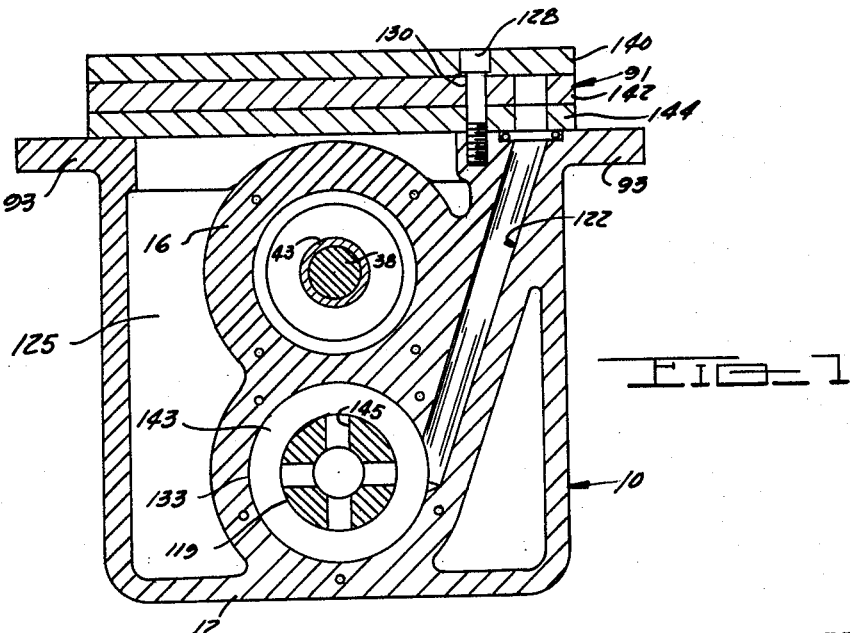
INVENTOR.
WALTER G. BIHLER
BY
SMITH, WILSON, LEWIS & McRAE

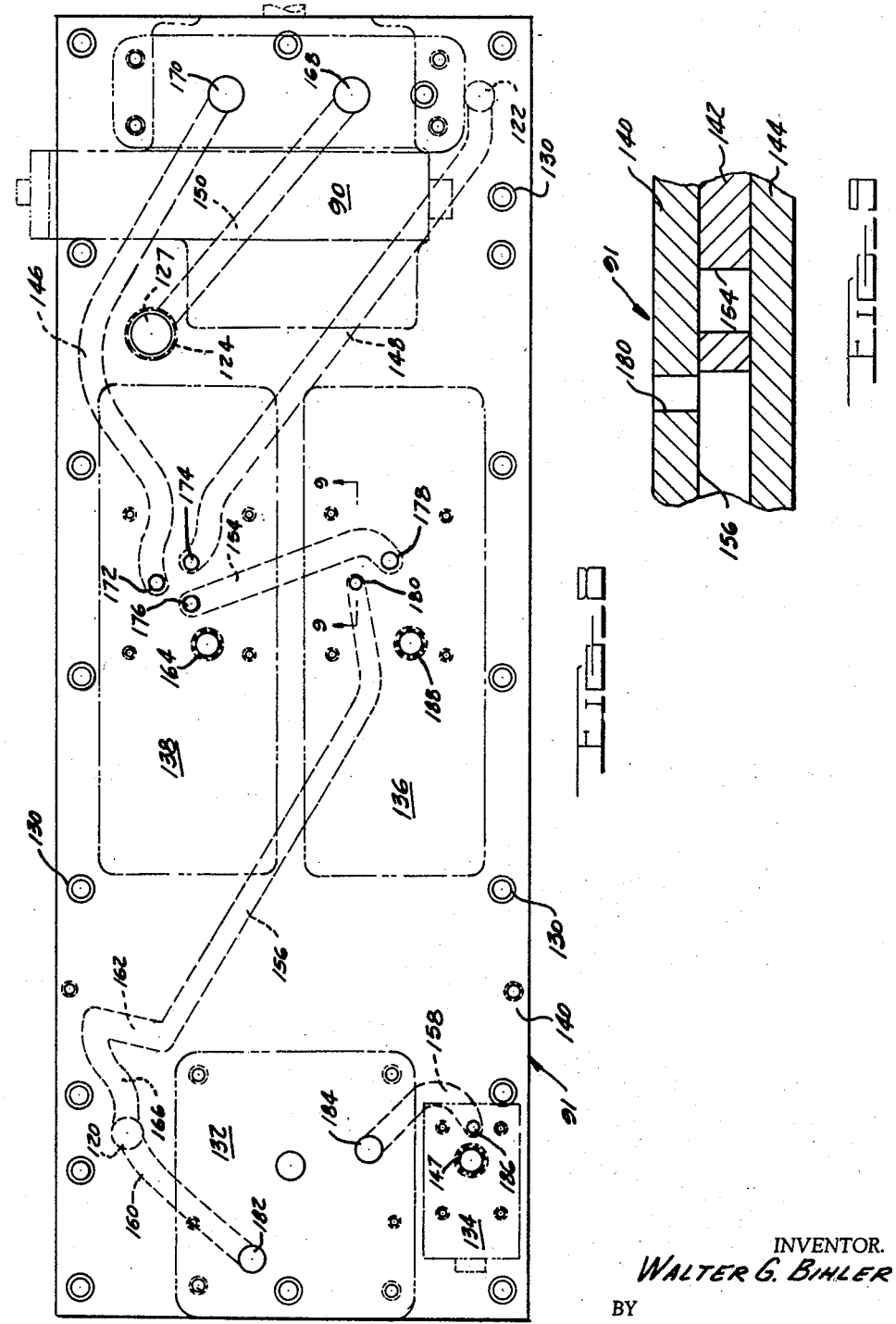

United States Patent Office 2,915,924
Patented Dec. 8, 1959

2,915,924

HYDRAULIC MACHINE TOOL

Walter G. Bihler, Franklin, Mich.

Application December 27, 1957, Serial No. 705,706

12 Claims. (Cl. 77—33.5)

The present invention relates to a machine tool, and more particularly to a machine tool of the type wherein a tool is advanced towards and retracted from a workpiece. The machine tool of the present invention permits the use of either a rotatable or non-rotatable tool which may have a work cycle which is separately controlled so that it may be advanced towards a work-piece at a rapid traverse speed followed by a slow feed speed or at an entirely rapid traverse or entirely slow feed speed followed by a rapid return to the starting point. In a machine embodying the present invention, the spindle carrying the tool is moved axially by electrically controlled hydraulic means and may be rotated by means of the prime mover.

Machine tools of the general type to which the present invention appertains have heretofore been known. However, such prior machines have required the skills of several trades for repairing, maintaining and setting-up and consequently have not provided the economies of operation inherent in a machine embodying the present invention.

The present invention also incorporates the additional novel features of being usable with either a rotating or non-rotating tool and includes safety features which operate in the event the spindle is stopped by the operator during a work cycle or by a power failure. In the event of failure of either one or both of the electrical control solenoids the machine will not inadvertently rapid traverse forward. The spindle will retract before feeding the tool to the work-piece when the machine is started after a stoppage by the operator or by power failure. Thus the danger of accidents is minimized should the machine be accidentally or unexpectedly started.

Accordingly, it is a primary object of the present invention to provide a simplified and efficient hydraulic machine tool construction embodying a spindle which is hydraulically actuated to feed into a work-piece in a predetermined sequence by a compact and efficient hydraulic unit.

It is a further object of the present invention to provide a hydraulic unit which permits the use of standard components that may be readily purchased, installed and maintained by those having ordinary mechanical skills.

Another object of this invention is to provide a pulley drive for both a hydraulic pump and a spindle which will utilize the same power source for driving both the pump and spindle and in which the speed of the spindle can be independently controlled.

Another object of this invention is the provision of such a machine tool having disengageable means separate from the hydraulic means to rotate the spindle whereby the machine may be utilized to perform work requiring either a rotating or non-rotating tool.

Still another object of the present invention is to provide a machine tool wherein all of the parts are readily accessible and removable for service, set-up and maintenance operations.

A further object of this invention is the provision of control shafts which may be used interchangeably as required to permit the machine tool to be used in a variety of arrangements in relation to its physical surroundings.

Another object of the present invention is to provide a construction which will permit a rapid changing of tools without disturbing the settings of the feed dogs which actuate the hydraulic control systems.

A further object of this invention is the provision of safety features which will prevent accidental or unintended forward movement of the spindle after stoppage of the machine during a work cycle.

Other objects of this invention will appear in the following description and appended claims, reference being had to the accompanying drawings forming a part of this specification wherein like reference characters designate corresponding parts in the several views.

In the drawings:

Fig. 1 is a general view in perspective of a hydraulic machine tool with a cover removed for illustrative purposes in which a preferred embodiment of the present invention is incorporated.

Fig. 2 is a schematic representation of an electrical control system used in the machine shown in Fig. 1.

Fig. 3 is a side elevational view of the machine shown in Fig. 1 with parts broken away for clarity.

Fig. 5 is a sectional view taken substantially along the line 5—5 in the direction of the arrows of Fig. 3.

Fig. 6 is a sectional view taken substantially along the line 6—6 in the direction of the arrows of Fig. 3.

Fig. 7 is a sectional view taken substantially along the line 7—7 in the direction of the arrows of Fig. 3.

Fig. 8 is a top plan view of a hydraulic manifold utilized in the machine shown in Fig. 1.

Fig. 9 is a sectional view taken substantially along the line 9—9 in the direction of the arrows of Fig. 8.

Fig. 10 is a schematic representation of a hydraulic system utilized in the machine shown in Fig. 1.

Figure 4:
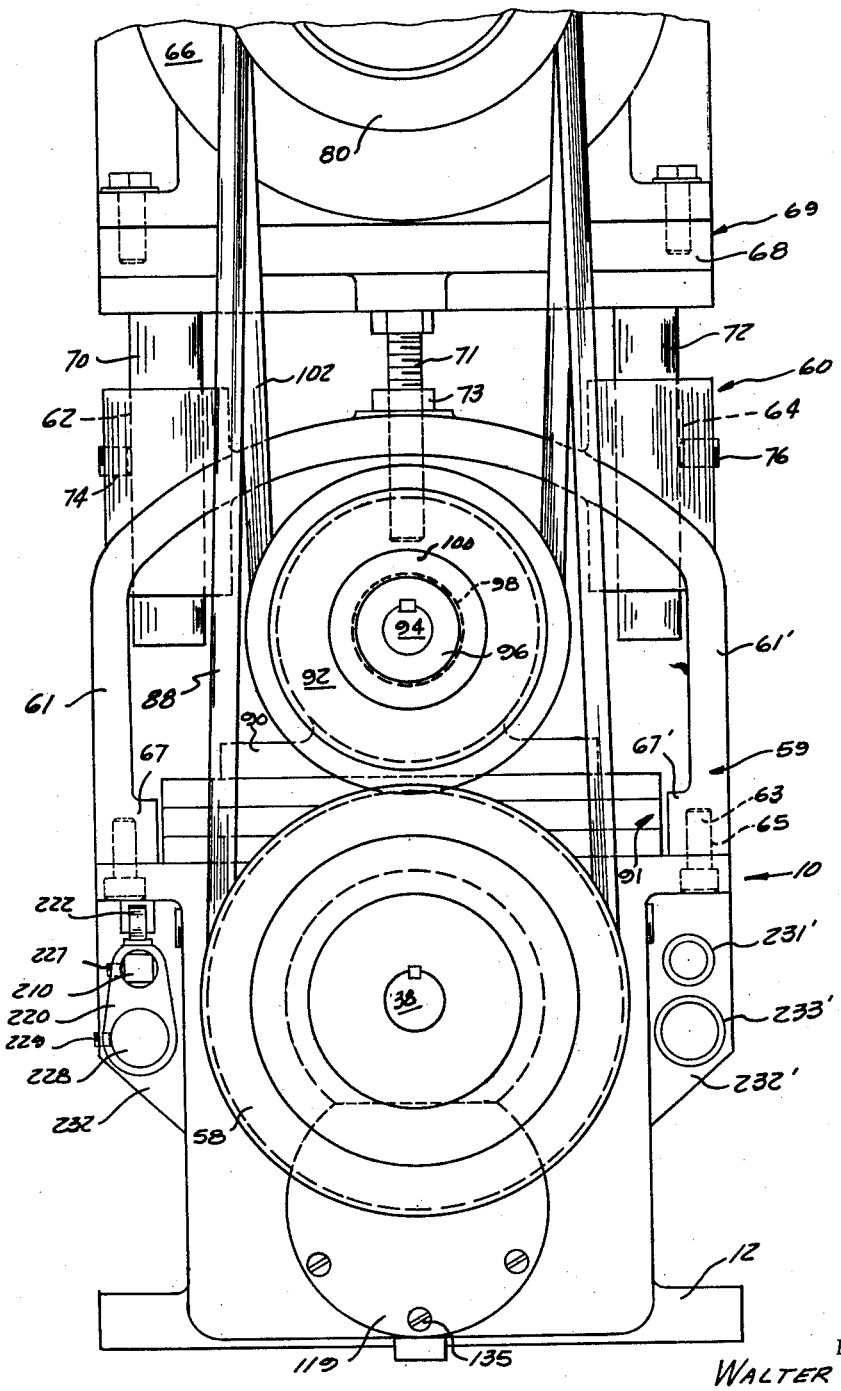
Fig. 4 is an end elevational view of the machine shown in Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The machine may be conveniently divided into seven parts for the purpose of description. These include the spindle which carries the rotary tool, the prime mover which rotatively drives the spindle and an hydraulic pump, the hydraulically actuated piston which provides an axial drive for the spindle, the physical arrangement and description of the hydraulic components which actuate the piston, the hydraulic circuit in which these components are utilized, and lastly the electrical circuit and associated mechanical means which control the operation of the hydraulic system.

*General arrangement*

The machine comprises a housing 10 upon which is mounted a motor 66. The motor 66 drives two shafts 20, 94 by means of a belt and pulley arrangement. One of the shafts is the input shaft 94 of an hydraulic pump 90. The other shaft is the spindle 20 which may carry a rotating tool at one end. The spindle 20 is mounted longitudinally within the housing 10. The spindle 20 is formed in two spline sections 34, 36 in order to accomplish concurrent rotative and longitudinal movement. An hydraulic piston 104 is also mounted inside a cylinder 114 which is mounted within the housing 10, parallel to the spindle 20. The piston 104 is driven axially by means of an hydraulic system. The piston 104 and spindle 20 are connected to move together by means of a crosshead 26. The machine work cycle may comprise a rapid forward approach to the work, a slow feed of the tool into the work and a rapid retraction to the start position. If desired, the machine may be set up so that the forward movement is entirely a rapid traverse or entirely a slow feed speed. This cycle is determined by means of an electrical circuit which controls the hydraulic components. The electrical circuit is in turn actuated by mechanical means mounted to move with the spindle 20 and piston 104. The following is a more detailed description of the machine tool.

Spindle and associated parts

As shown in Fig. 1 the drilling machine comprises an open top tank type housing 10 which is supported on its base 12. A cover 11, indicated by the dotted line, is removed for illustrative purposes. The machine may be mounted on any suitable surface by suitable attaching means which may extend through the openings 14 in the base 12. While a horizontal position is here shown by way of example, the machine may be mounted to operate either in a vertical or in a horizontal plane.

Fig. 3 shows the interior of the housing 10. A tubular support 16 extends throughout the length of the housing 10 and is integral therewith. A quill or slidable bearing support 18 is mounted within the support 16. A crosshead 26 is formed on the forward end of the bearing support 18. The female spline section 34 of the spindle 20 is rotatably mounted within the crosshead 26 and bearing support 18 by means of suitable bearings 22, 24. An annular plate 28 is fastened to the crosshead 26 by means of machine screws 30. The plate 28 bears against the outer race of the bearings 22 and an oil seal 31.

The spindle 20 comprises conventional female 34 and male 36 spline sections. The female spline 34 carries a spindle nose 32 at its forward end to which a single or multiple spindle assembly for rotary tools, such as drills or reamers (not shown), may be attached. A non-rotary tool may also be attached to the spindle nose 32 when the machine is to be used, for example, as an hydraulic press or a broaching machine. A plurality of openings 35, as best seen in Fig. 1, are provided in the crosshead 26 for the purpose of attaching a multiple spindle drill head or other suitable tool if desired.

The spindle nose 32 has a diameter larger than the remainder of the spline 34 to form a shoulder 33 which bears against the inner race of the bearing 22. An externally threaded portion 37 is provided on the female spline 34 adjacent the bearing 22. A lock-nut 39 is screwed onto the threaded portion 37 and bears against the bearing 22. The shoulder 33 and nut 39 act to fasten the female spline 34 to the crosshead 26.

The axially stationary male spline shaft 36 extends matingly into the female spline 34. The male spline shaft 36 has an ungrooved section 38 at the rearward end. The ungrooved section 38 is rotatably mounted within a bearing support 40 by means of bearings 42, 44. These bearings 42, 44 are kept in axial alignment by means of a nut 41, a spacer 43 and the shoulder of a stepped-up portion 45 of the male spline shaft 36 which bears against the inner face of the bearing 44.

The bearings 42, 44 are carried within the bearing support 40. The bearing support 40 comprises a tubular section 46 which projects into the support 16 and an annular flange portion 48 which bears against the housing 10. A plate 50 is fastened to the housing 10 by means of machine screws 52. The screws 52 project through holes provided in the support 40 thus fastening the support 40 in place. An oil seal 54 is inserted into an annular recess 56 provided in the plate 50. A portion of the male spline shaft 36 projects from the housing 10.

A double groove sheave 58 is keyed to this extending portion.

The prime mover

As may be best seen in Figs. 3 and 4, a motor 66 and motor support 60 are mounted at the rearward end of the housing 10. The motor support 60 has an inverted U-shaped base 59 which is mounted on top of the housing 10 with the sides 61, 61' pointing downward. The base 59 is fastened to the housing 10 by means of a plurality of machine bolts 63 which extend upward from the housing 10 into threaded openings 65 provided in the inwardly extending feet 67, 67' of the sides 61, 61'.

The base 59 is provided with two vertically projecting sockets 62, 64. An adjustable motor mount 69, comprising a base 68 and two downwardly extending posts 70, 72, is slidably mounted on the base 59 with the posts 70, 72 extending into the sockets 62, 64. Set screws 74, 76 help to secure the posts 70, 72 against downward movement. The motor 66 is mounted on the motor mount 69.

The head of a machine bolt 71 projects from the base 59 into abutment with the base 68 of the motor mount 69. The motor mount 69 and motor 66 may be raised or lowered by turning the bolt 71. A jam nut 73 is provided for the purpose of locking the bolt 71 at the desired elevation. The bolt 71 also provides additional vertical support for the motor 66.

A sheave 78 is mounted on the output shaft 84 of the motor 66. The sheave 78 is provided with a cylindrical projection 82. A second double groove sheave 80 is mounted on this projection 82. Two V-belts 86, 88 connect the sheaves 80, 58, thus providing a rotary drive from the motor 66 to the spindle 20. When it is desired to operate the unit with a non-rotary tool, the belts 86, 88 may be removed.

A variable volume spring compensated pump 90 is mounted on a hydraulic manifold 91 at the rearward end of the housing 10 within the U-shaped base 59. A sheave 92 is mounted on the input shaft 94 of the pump 90. This sheave 92 is a split sheave formed in two parts. One half 96 is keyed to the shaft 94. This half 96 is provided with an axially projecting threaded portion 98. The second half 100 is screwed onto the threaded portion 98. A V-belt 102 connects the sheaves 92, 78, thus providing a rotary drive from the motor 66 to the pump 90.

The tension in the V-belt 102 and the speed of rotation of the shaft 94 may be varied by adjusting one half 100 of the sheave 92 to vary the effective diameter of the sheave 92.

The hydraulic piston

The female spline 34 of the spindle 20 is extended and retracted by means of a hydraulically actuated piston 104 which is also connected to the crosshead 26. As best seen in Fig. 3, a stepped down portion 106 of the piston rod 108 extends through a passageway 115 in the housing 10 and into and through an opening 110 in the crosshead 26. The rod 108 is fastened to the crosshead 26 by means of a lock nut 112.

The piston 104 rides in a cylinder 114 which is mounted within the housing 10 parallel to the tubular support 16. The cylinder 114 is sealingly connected at its forward end to a tubular housing 117 which extends into the passageway 115 formed integrally with the housing 10. A removable packing insert 116 is inserted into the rear of the tubular housing 117 and retained by means of a shoulder 121 abutting against a flange 123 of the insert 116 and a snap ring 129. A plurality of O rings 131 are also provided to completely seal the forward end of the cylinder 114. A plug 119 is inserted through an opening 133 in the rearward end of the housing 10 and into the cylinder 114 to support and seal the rearward end of the cylinder 114. The plug 119 is secured to the housing 10 by means of machine screws 135 and seals the cylinder 114 and housing 10 in cooperation with a plurality of O rings 137. The piston 104 and cylinder 114 are sealed by means of removable packing 118 mounted in the piston 104.

The hydraulic system

A conduit 120, which is formed integrally with the housing 10, leads from the manifold 91 to an annular passageway 139 in the tubular housing 117. Radial passageways 141 lead from the annular passageway 139 thus providing liquid communication between the manifold 91 and the forward end of the cylinder 114. A second conduit 122, which is also formed integrally with the housing 10, leads from the manifold 91 to an annular passageway 143 in the plug 119. Radial passageways 145 lead from the annular passageway 143 thus providing liquid communication between the manifold 91 and the rearward end of the cylinder 114.

A length of pipe 124 leads from the manifold 91 to the interior of the housing 10. An elbow section 126 may be fastened to the lower end of the pipe 124 to lie below the level of the fluid contained within a reservoir or tank 125 located in the interior of the housing 10.

As best seen in Fig. 1, a plurality of ports 113 are provided in either side of the housing 10. These ports 113 are in communication with the tank 125. They serve as drains, filling points, fluid level checks and pressure level stations. The various locations provide sufficient ports for the machine in either a horizontal position or a vertical position. The ports 113, when not in use, are closed by means of dry seal pipe plugs 111.

The hydraulic manifold 91 is secured to the upper surface of the housing 10 by means of a flange 93 which extends around the periphery, as shown in Fig. 1. It extends into the U-shaped base 59 of the motor support 60 to a point adjacent the rearward end of the housing 10. The manifold 91 is attached to the housing 10 by means of a plurality of machine screws 128 which extend through openings 130 provided in the manifold 91.

The pump 90 and valves 132, 134, 136, 138 are operatively secured to the upper plate 140 of the manifold 91, as best seen in Figs. 1 and 8. Valves 136, 138 are solenoid operated two-position 4-way valves. Valve 132 is a flow control valve and valve 134 is a check valve.

The manifold 91, may be formed of separate plates suitably secured together. The embodiment shown in Figs. 8 and 9, comprises three parallel plates 140, 142, 144 having their adjacent faces engaged to form a sandwich structure. The plates are suitably joined together in fluid tight engagement between the various conduits and parts by any suitable means such for example as brazing or silver soldering. The upper and lower plates 140, 144 are formed with openings to provide ports for fluid flow into and out of the manifold 91. The central plate 142 in the sandwich structure is formed with a plurality of slots to provide conduits for circulation of fluid between the aforementioned ports. The purpose of the manifold 91 is to provide a compact and simple means to provide fluid communication among the valves 132, 134, 136, 138, the pump 90, the tank 125 and the cylinder 114.

Although a specific arrangement of conduits and ports in the manifold 91 is shown by way of example, it is to be understood that there are many other possible arrangements. As best seen in Fig. 8, a port 168 in the upper plate 140 registers with the inlet port of the pump 90. A conduit 150 in the core 142 leads from the port 168 to the pipe 124 which extends through a port 127 in the lower plate 144 and into the tank 125. A strainer may be installed in this line so as to screen the hydraulic fluid before it reaches the pump 90.

A port 170 in the upper plate 140 communicates with the outlet port of the pump 90. A conduit 146 in the core 142 leads from the port 170 to the 4-way valve 138 through the port 172 in the upper plate 140.

A conduit 148 in the core 142 communicates with the valve 138 by means of a port 174 in the upper plate 140. This conduit 148 leads to the aforementioned conduit 122 which communicates with the rearward end of the fluid supply line feed cylinder 114.

The valve 138 communicates with the second 4-way valve 136 by means of the conduit 154 via the ports 176, 178 in the upper plate 140.

The valve 136 communicates with the flow-control valve 132 by means of the conduits 156, 162, 166, 160 in the core 142 via the ports 180, 182 in the upper plate 140.

The conduit 120 which leads to the forward end of the fluid supply lines leading to the cylinder 114 is connected to valves 132, 136 at the juncture of the conduits 160, 166.

The valve 132 is operatively connected to the check valve 134 by means of the conduit 158 in the core 142 via the ports 184, 186 in the upper plate 140.

The ports 147, 164, 188 in the upper plate 140 of the manifold 91 register with ports in the respective valves 134, 138 and 136 to provide communication with the tank 125. Ports 147, 164, 188 are tank lines drained by means of short lengths of pipe (approximately 5 inches long in the present embodiment) which extend through the core 142 and plate 144 to empty into the tank 125.

The hydraulic circuit

The operation of the hydraulic circuit is illustrated in Fig. 10. The pump 90 draws hydraulic fluid from the tank 125. When both solenoid valves 138, 136 are de-energized the flow path is from the pump 90 through the valves 136, 138 and back to the tank 125. This permits the motor 66 and pump 90 to be run continuously without a heat build up in the fluid which results in keeping the feed rate at a more uniform value and increasing the effective service life of the pump 90. A secondary advantage is the resultant increased service life of the solenoids in the valves 136, 138.

When the piston is to be driven in a rapid forward direction, both solenoid valves 136, 138 are activated. Fluid is pumped at a maximum rate through the valve 138 and into the rearward portion of the cylinder 114. The fluid in the forward portion of the cylinder is removed to the tank 125 through the valves 136 and 138. The fourth port that would complete a second simultaneous path through the valve 136 is blocked at all times.

A slow forward feed speed is accomplished by activating the valve 138 and de-activating the valve 136. This blocks the route to the tank 125 through the valve 136. The fluid must now pass through the variable flow control valve 132 and check valve 134 in order to reach the tank 125. The variable flow control valve 132 reduces the speed of the forward travel of the piston 104. The check valve 134 serves to keep a constant back pressure against the valve 132. The check valve 134 also prevents draining of the fluid through the flow control 132 to the tank 125 when the machine is mounted with the nose 32 pointed downwardly at an angle to the horizontal. This is desirable to prevent drifting of the tool from its retracted position when the motor is stopped.

In order to drive the piston 104 in a rapid reverse direction the valve 136 is activated and the valve 138 is de-activated. Fuid passes through the valves 138, 136 and to the forward portion of the cylinder 114. Fluid is evacuated from the rearward portion of the cylinder through a second path in the valve 138 to the tank.

The electrical control circuit and associated mechanical actuation means

The operation of the solenoid valves 136, 138 is controlled by an electrical circuit. The circuit is illustrated schematically in Fig. 2. The circuit as shown indicates the machine tool at rest in the retracted position. In order to start the cycle of operation, a cycle or start switch 190 is closed, completing the circuit through the windings 192' of a relay 192. The contacts 214, 216, 194 of relay 192 are closed and the contacts 218 are opened. This results in the circuit through the winding 192' remaining closed when the start switch 190 is released, the closing of the circuit through the windings 204' of a second relay 204, and the energizing of the 4-way valve 138. The contacts 206 of relay 204 are closed due to the action of the windings 204' of the second relay 204 thus energizing the 4-way valve 136. This is the condition for rapid forward travel of the piston 104 as has been previously described.

When the piston 104 has moved a short distance forward, the trip dog 196, as seen in Fig. 1, will disengage from contact with the limit switch 198. The normally open contacts 200 of the switch 198 will assume the open position and the normally closed contacts 202 of the switch 198 will close. This prevents the circuit through the windings 192' being closed by means of the switch 190 and provides a second path through the windings 204' of the relay 204 when the relay 192 is de-energized.

When the piston 104 has advanced a distance determined by a flat 212 in the rod 210, the normally open contacts 208' of a second limit switch 208 will be released. The contacts 208' of the switch 208 will open, thus de-energizing the windings 204' and consequently de-energizing the solenoid of the valve 136. The piston 104 will then advance at a slow feed speed as previously described.

When the piston 104 is extended to the limit setting of trip dog 220, the trip dog 220 will engage the third limit switch 222. The normally open contacts 222' of the switch 222 will close thus energizing the windings 224' of a time delay relay 224. The contacts 226 of the relay 224 will open, deenergizing the windings 192' of the relay 192. This will de-energize the solenoid of the valve 138 and energize the windings 204' of the second relay 204. When the contacts 206 of the relay 204 close, the valve 136 will be energized, providing the condition for rapid reverse travel.

If for any reason the power to the electrical control circuit is cut off during the cycle of operation, there is no danger that the piston 104 will travel forward when it is resumed. The windings 192' of the relay 192 cannot be energized in any other than the start position as the contacts 200 of the switch 198 and the contacts 214 of the relay 192 will be open. The cycle will automatically start in the rapid return phase, since the contacts 202, 218 will be closed thus energizing the windings 204' of the relay 204 and consequently energizing the valve 136. A second safety feature is the switch 225, an emergency return switch, which will provide the condition for rapid return as explained above by de-energizing the windings 192' of relay 192.

The feed and rapid return settings are made by means of the rod 210 and trip dog 220. The rod 210 is provided with four horizontally staggered longitudinal flats 212 spaced on the periphery at 90° intervals.

The desired flat 212 may be selected by loosening the set screw 227 in the trip dog 220 and rotating the rod 210. A fine adjustment may be accomplished by moving the rod 210 axially. The trip dog 220 may also be moved axially, thus selecting a point for the rapid return, by loosening the set screws 227, 229. The bar 228 upon which the rod 210 is mounted extends through an opening in the crosshead 26 and is attached by means of a nut 230. A projection 232, having openings 231, 233 to guide and support the rod 210 and bar 228, is provided on the side of the housing 10. As may be seen in Fig. 4, a similar projection 232' having openings 231', 233' is provided on the other side of the housing 10 so that the rod 210 and bar 228 may be shifted to the opposite side. Provision is also made for the switches 198, 208, 222 on either side of the manifold 91.

General characteristics and operation

In operation a work piece may be held by means of a jig or fixture located at a suitable distance from the crosshead 26. A tool, as for example a drill, may be held in a chuck attached to the spindle nose 32. The rod 210 is rotated so that the desired flat faces upward and a fine adjustment is made by moving the rod axially. This will determine the point at which the forward movement of the cutting tool will begin its slow feed speed. It should be a point some distance before the actual cutting begins. The depth of the cut is then determined by adjusting the trip dog 220. The operating cycle may then be started by depressing the switch 190.

The components of the machine tool may be easily removed for repair and maintenance. The cylinder and piston assembly may be removed by unscrewing the nut 112 and removing the plate 119 and sheave 58. The quill and spindle assembly may be easily removed by removing nuts 112 and 230 which frees the cross head 26 and its associated parts for lateral withdrawal from the housing. The manifold 91 and associated parts are also easily removable. Consequently, the machine may be readily and economically serviced by those having ordinary mechanical skills.

The machine is safe in that after it has been stopped by power failure or by the operator as when a tool becomes jammed in the work and must be changed while the spindle 20 is in the forward position, the spindle cannot be fed forward until first retracted. In the event of failure of one or both of the solenoids of valves 136, 138 the machine will not inadvertently rapid traverse forward.

A further advantage of the present construction resides in the efficiency with which tools may be changed. The quill holding the tool can be retracted to its most rearward position without disturbing the setting of the feed dog and the new tool may then be mounted. It is only necessary to adjust the forward trip dog 196 (which controls the point at which the unit stops in its rearward position) in order to set-up the machine for the new tool. This feature is very important when "pre-set" tools are used.

An important commercial aspect of the present invention is that all hydraulic lines under pressure are integral with either the housing or the manifold thus avoiding external lines and threaded connections. All hydraulic components can be readily connected into the system or removed therefrom without requiring separate pipe connections.

While the manifold shown and described herein is formed of three plates it is to be understood that it may be formed of any desired number of separate plates.

Having thus described my invention, I claim:

1. A machine tool comprising a housing including an hydraulic fluid tank, a spindle slidably mounted within said housing; said spindle adapted to hold a tool at one end; hydraulic means to drive said spindle axially; said hydraulic means comprising a cylinder within said housing, a piston disposed within said cylinder and connected with said spindle for axial movement therewith, a power driven pump, a plurality of control valves and said hydraulic fluid tank; a manifold mounted on said housing comprising a plurality of parallel plates with their adjacent faces in fluid-tight engagement to form a laminated structure; the outer faces of said laminated structure being formed with openings directed towards the center of the manifold to provide ports for fluid flow into and out of the manifold; at least one plate in said laminated structure having a plurality of slots projecting from an engaged adjacent face towards an outer manifold face; each of said slots extending between two of said ports to define conduits for circulation of fluid therebetween; a power driven pump and a plurality of control valves each directly mounted on one of the outer manifold faces; inlet and outlet ports provided in each of the pump and control valves; said ports being in registry with respective ones of the manifold; and conduit means extending from said manifold to said cylinder and tank whereby the pump, control valves, cylinder and tank are in fluid communication.

2. A machine tool comprising a housing including an hydraulic fluid tank having a tool driving splined spindle slidably mounted therein; a cylinder within said housing, a piston disposed in said cylinder, said piston and spindle being directly connected to move axially, and an hydraulic system comprising a plurality of hydraulic components for feeding said piston to move in alternate directions; a manifold mounted on said housing comprising a plurality of parallel plates with their adjacent faces in fluid-tight engagement to form a laminated structure; the outer faces of said laminated structure being formed with openings directed towards the center of the manifold to provide ports for fluid flow into and out of the manifold; at least one plate in said laminated structure having a plurality of slots projecting from an engaged adjacent face towards an outer manifold face; each of said slots extending between two of said ports to define conduits for circulation of fluid therebetween; each of the components of said hydraulic system being directly mounted on one of the outer manifold faces; inlet and outlet ports provided in each of the hydraulic components; said ports being in registry with respective ones of the manifold; and conduit means extending from the manifold to said cylinder and tank whereby the components of the hydraulic system, the cylinder and the tank are in fluid communication.

3. A machine tool comprising a housing including an hydraulic fluid tank having a tool driving spindle slidably mounted therein; said spindle comprising a male spline section and a female spline section, means adapted to rotate one of said spline sections and hydraulic means to drive the other of said spline sections axially; said hydraulic means comprising a cylinder within said housing, a piston disposed within said cylinder and connected with said other spline section for axial movement therewith, a power driven pump, a plurality of control valves and said hydraulic fluid tank; a manifold mounted on said housing comprising a plurality of parallel plates with their adjacent faces in fluid-tight engagement to form a laminated structure; the outer faces of said laminated structure being formed with openings directed towards the center of the manifold to provide ports for fluid flow into and out of the manifold; at least one plate in said laminated structure having a plurality of slots formed in an engaged adjacent face; each of said slots extending between two of said ports to provide conduits for circulation of fluid therebetween; a power driven pump and a plurality of control valves each directly mounted on one of the outer manifold faces; inlet and outlet ports provided in each of the pump and control valves; said ports being in registry with respective ones of the manifold; and conduit means extending from said manifold to said cylinder and tank whereby the pump, control valves, cylinder and tank are in fluid communication.

4. A machine tool comprising a housing including an hydraulic fluid tank having a tool driving spindle slidably mounted therein, said spindle comprising a male spline section and a female spline section, hydraulic means to drive said female spline section axially; said hydraulic means comprising a cylinder within said housing, a piston disposed within said cylinder and connected with said female spline section for axial movement therewith, a power driven pump having an input shaft, a plurality of control valves and said hydraulic fluid tank; a manifold mounted on said housing comprising a plurality of parallel plates with their adjacent faces in fluid-tight engagement to form a laminated structure; the outer faces of said laminated structure being formed with openings directed toward the center of the manifold to define ports for fluid flow into and out of the manifold; at least one plate in said laminated structure having a plurality of slots projecting from an engaged adjacent face towards an outer manifold face; each of said slots extending between two of said ports to provide conduits for circulation of fluid therebetween; a power driven pump and a plurality of control valves each directly mounted on one of the outer manifold faces; inlet and outlet ports provided in each of the pump and control valves; said ports being in registry with respective ones of the manifold; and conduit means extending from said manifold to said cylinder and tank whereby the pump, control valves, cylinder and tank are in fluid communication; means to rotatably drive said pump and engageable to rotatively drive said male spline section; said driving means comprising a motor mounted on said housing drivingly connected to said pump by means of a belt and pulley mechanism and adapted to be drivingly connected to said male spline section by means of a belt and pulley mechanism; said motor being adjustable to vary the tension on said last mentioned belt and pulley mechanism; said mechanism including a split sheave mounted on the input shaft of said pump whereby the speed of said pump and tension on said sheave may be adjusted independently of said motor.

5. A machine tool comprising a housing having a tool driving splined spindle slidably mounted therein, means adapted to rotate said spindle, a cylinder within said housing, an hydraulic piston disposed in said cylinder, said piston and spindle being directly connected to move axially, and an hydraulic system for moving said piston in a predetermined sequence comprising combinations of a rapid forward movement, a slower forward movement and a rapid rearward movement, an electrical circuit operative to actuate said hydraulic system in said sequence; a plurality of limit switches operative to actuate said electrical circuit mounted on one side of said housing; a mechanism slidably mounted on said housing adjacent the limit switches; said mechanism comprising a longitudinal bar connected with said spindle to move therewith; a plurality of adjustable trip dogs on said bar each adapted to actuate a limit switch; a rod adjustable around and along its central axis extending between said trip dogs; said rod having a plurality of staggered longitudinal indentations spaced around its periphery; the outer peripheral surface of said rod adapted to engage and actuate a limit switch whereby said rod and one of its indentations and said trip dogs cooperate to sequentially actuate said limit switches.

6. In a machine tool, a housing including an hydraulic fluid tank having a cylinder and bore in parallel alignment, said bore being formed integrally with the housing and extending between two opposite walls to form a passageway therethrough, a tool driving splined spindle slidably mounted within said bore, means adapted to rotate said spindle, said cylinder being detachably mounted within the housing to extend between the said two opposite walls to form a second passageway therethrough, a piston disposed in said cylinder, said piston and spindle being directly connected to move as a unit axially, and an hydraulic system comprising a plurality of hydraulic components for moving said piston in alternate directions and at alternate speeds; and a manifold for interconnecting the components of said hydraulic system; said manifold being mounted on said housing and comprising a plurality of parallel plates with their adjacent faces in fluid-tight engagement to form a laminated structure; the outer faces in said laminated structure being formed with openings directed towards the center of the manifold to define ports for fluid flow into and out of the manifold; at least one plate in said laminated structure having a plurality of slots projecting from an engaged adjacent face towards an outer manifold face; each of said slots extending between two of said ports to provide conduits for circulation of fluid therebetween; each of the components of the hydraulic system being directly mounted on one of the outer manifold faces; inlet and outlet ports provided in each of the components of the hydraulic system; said ports being in registry with respective ones of the manifold; and conduit means extending from said manifold to said cylinder and tank whereby the hydraulic components, the cylinder and the tank are in fluid communication.

7. In a machine tool, a housing having a fluid-tight compartment therein, a tool driving spindle slidably mounted within said fluid-tight compartment, each end of said spindle extending for a short distance outside said housing, said spindle comprising a male spline section and a female spline section, means adapted to rotate one of said spline sections and to provide power for hydraulic means to drive the other of said spline sections axially, said hydraulic means comprising a cylinder provided within said housing, a piston disposed within said cylinder and connected with said other spline section for axial movement therewith, a power driven pump, a plurality of control valves and an hydraulic fluid tank comprising the aforementioned fluid-tight compartment; said pump, valves, tank and cylinder being interconnected by means of an hydraulic manifold comprising a plurality of parallel plates with their adjacent faces in fluid-tight engagement to form a laminated structure; the outer faces of said laminated structure being formed with openings directed towards the center of the manifold to provide ports for fluid flow into and out of the manifold; at least one plate in said laminated structure having a plurality of slots projecting from an engaged adjacent face towards an outer manifold face; each of said slots extending between two of said ports to provide conduits for circulation of fluid therebetween; said pump and valves each directly mounted on one of the outer manifold faces; inlet and outlet ports provided in each of the pump and valves; said ports being in registry with respective ones of the manifold; and conduit means extending from the said manifold to said cylinder and tank whereby the pump, valves, cylinder and tank are in fluid communication.

8. A machine tool comprising a housing including an hydraulic fluid tank having a tool driving splined spindle slidably mounted therein, means adapted to rotate said spindle, a cylinder provided within said housing, an hydraulic piston disposed in said cylinder, said piston and spindle being directly connected to move together axially, and an hydraulic system for feeding said piston to move in a predetermined sequence comprising a rapid forward movement, a slower forward movement and a rapid rearward movement; an electrical circuit operative to actuate said hydraulic system in said sequence; a plurality of limit switches operative to actuate said electrical circuit; a mechanism slidably mounted on one side of said housing adjacent the limit switches; said mechanism comprising an elongated bar connected with said spindle and piston to move therewith; a plurality of adjustable trip dogs on said bar each adapted to actuate a limit switch; a rod extending between said trip dogs; said rod being adjustable around and along its central axis; said rod having a plurality of staggered longitudinal indentations spaced around its periphery; the outer peripheral surface of said rod adapted to engage and actuate a limit switch whereby said rod and one of its indentations and said trip dogs cooperate to sequentially actuate said limit switches.

9. A machine tool as described in claim 8 and further characterized in that said housing is adapted to carry said limit switches and limit switch actuating mechanism on either side.

10. A machine tool as described in claim 8 and further characterized in that when said electrical circuit is de-activated during a sequence of operations, said electrical system, upon re-activation, will cause said hydraulic system to retract said spindle and piston.

11. A machine tool comprising a housing including an hydraulic fluid tank having a bore and a parallel cylinder therein, a slidable bearing support journaled within said bore, a crosshead provided on the forward end of said bearing support, a tool driving splined spindle rotatably mounted in said bearing support and crosshead, means adapted to rotate said spindle, a piston disposed in said cylinder, said piston and spindle being connected by means of said crosshead to move together axially, and an hydraulic system for moving said piston in alternate directions and at alternate speeds, a manifold mounted on said housing comprising a plurality of parallel plates with their adjacent faces in fluid-tight engagement to form a laminated structure; the outer faces in said laminated structure being formed with openings directed towards the center of the manifold to provide ports for fluid flow into and out of the manifold; at least one plate in said laminated structure having a plurality of slots projecting from an engaged adjacent face towards an outer manifold face; each of said slots extending between two of said ports to provide conduits for circulation of fluid therebetween; each of the components of said hydraulic system being directly mounted on one of the outer manifold faces; inlet and outlet ports provided in each of said hydraulic components; said ports being in registry with respective ones of the manifold; and conduit means extending from said manifold to said cylinder and tank whereby the hydraulic components, the cylinder and the tank are in fluid communication.

12. In a machine tool, a housing having a fluid-tight compartment therein; a bore formed integrally with the housing and extending between two opposite walls to form a passageway therethrough; a tool driving splined spindle slidably mounted within the bore; means adapted to rotate said spindle; a cylinder detachably mounted within the housing to extend between said two opposite walls to form a second passageway parallel to said bore; a piston disposed in said cylinder; said piston and spindle being directly connected to move axially as a unit; a manifold mounted on said housing comprising a plurality of parallel plates with their adjacent faces in fluid-tight engagement to form a laminated structure; the outer faces in said laminated structure being formed with openings directed towards the center of the manifold to define ports for fluid flow into and out of the manifold; at least one plate in said laminated structure having a plurality of slots projecting from an engaged adjacent face towards an outer manifold face; each of said slots extending between two of said ports to provide conduits for circulation of fluid therebetween; a power driven pump and a plurality of control valves each directly mounted on one of the outer manifold faces; inlet and outlet ports provided in each of the pump and control valves; said ports being in registry with respective ones of the manifold; and a conduit formed integrally with said housing extending from a port in said manifold to the rod end of said cylinder; a second conduit formed integrally with said housing extending from a port in said manifold to the head end of said cylinder; and conduit means extending from said pump to said tank whereby the pump, control valves, cylinder and tank are in fluid communication.

References Cited in the file of this patent

UNITED STATES PATENTS

| | | |
|---|---|---|
| 2,178,364 | Svenson | Oct. 31, 1939 |
| 2,190,284 | Foshie | Feb. 13, 1940 |
| 2,374,764 | Mathys | May 1, 1945 |